Figure 1:
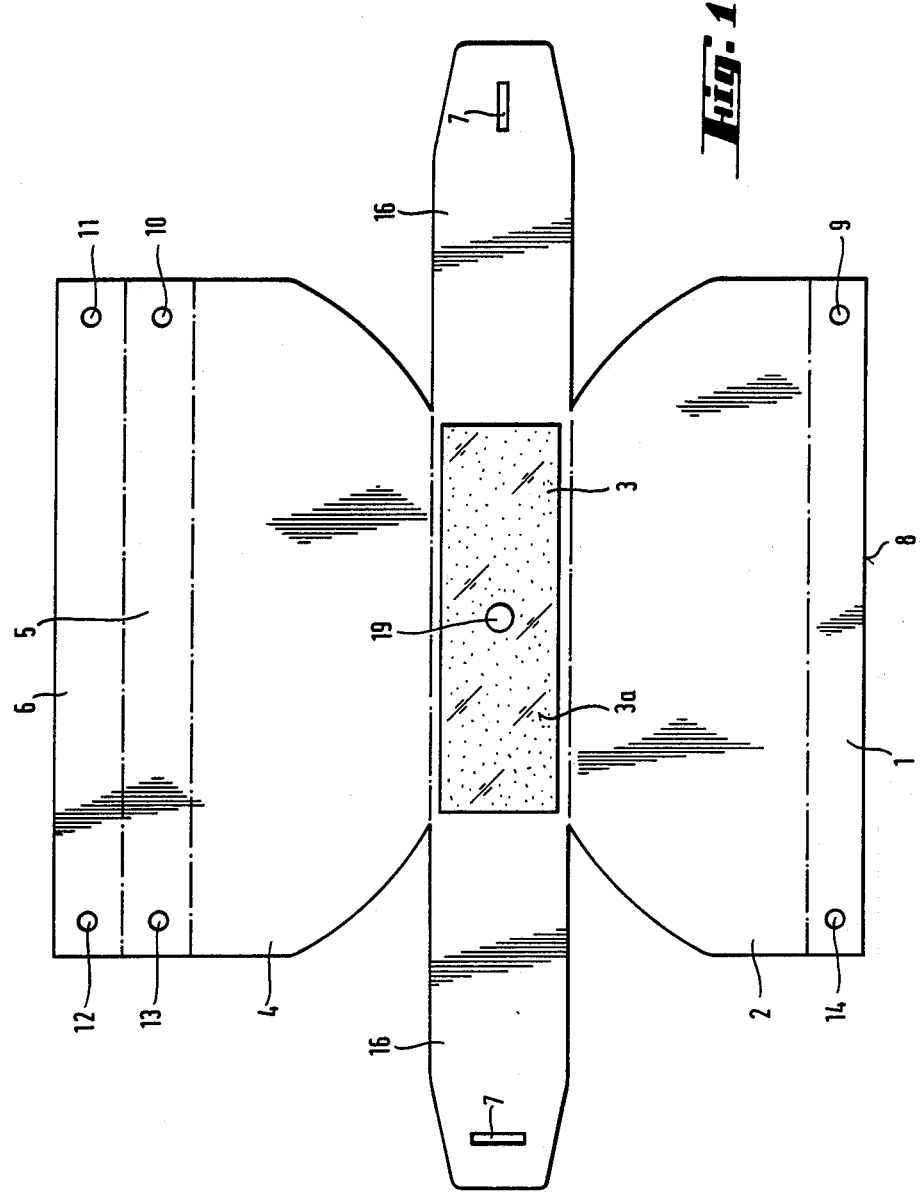

United States Patent [19]

Hoppe

[11] Patent Number: 4,961,282
[45] Date of Patent: Oct. 9, 1990

[54] TRAP FOR FLYING INSECTS, ESPECIALLY MOTHS THAT ATTACK FOODSTUFFS

[75] Inventor: Thomas Hoppe, Rheinfelden, Switzerland

[73] Assignee: Ciba-Geigy Corporation, Ardsley, N.Y.

[21] Appl. No.: 389,154

[22] Filed: Aug. 2, 1989

[30] Foreign Application Priority Data

Aug. 10, 1988 [CH] Switzerland ............... 3017/88

[51] Int. Cl.$^5$ ............................................... A01M 1/14
[52] U.S. Cl. ...................................................... 43/114
[58] Field of Search .......................... 43/114, 115, 118

[56] References Cited

U.S. PATENT DOCUMENTS

| | | | |
|---|---|---|---|
| 827,006 | 7/1906 | Gathmann et al. | 43/115 |
| 919,149 | 4/1909 | Foster | 43/114 |
| 1,112,064 | 9/1914 | Gordon | 43/115 |
| 2,258,683 | 10/1941 | Ketterer | 43/114 |
| 4,829,702 | 5/1989 | Silvandersson | 43/114 |

FOREIGN PATENT DOCUMENTS 26419  6/1981  European Pat. Off.
614349 8/1977  Switzerland.

OTHER PUBLICATIONS

Journal of Economic Entomology, 70, 489–492 (1977).
Dissertation—ETH #6837 (1981).

Primary Examiner—M. Jordan
Attorney, Agent, or Firm—Harry Falber

[57] ABSTRACT

The trap comprises optical attractants for luring the flying insects in the form of vertically arranged strips (15) of which the ratio of the sides is greater than 4:1. The trap base (3) and the layer of adhesive located thereon are both transparent. The trap itself is a delta trap in which the roof slopes (2, 4) reduce the amount of dust falling onto the adhesive. On both sides of the triangular openings of the trap the base (3) is extended to form approach surfaces (16). The strips (15) are fastened so as to hang down from the ends of the approach surfaces (16).

12 Claims, 3 Drawing Sheets

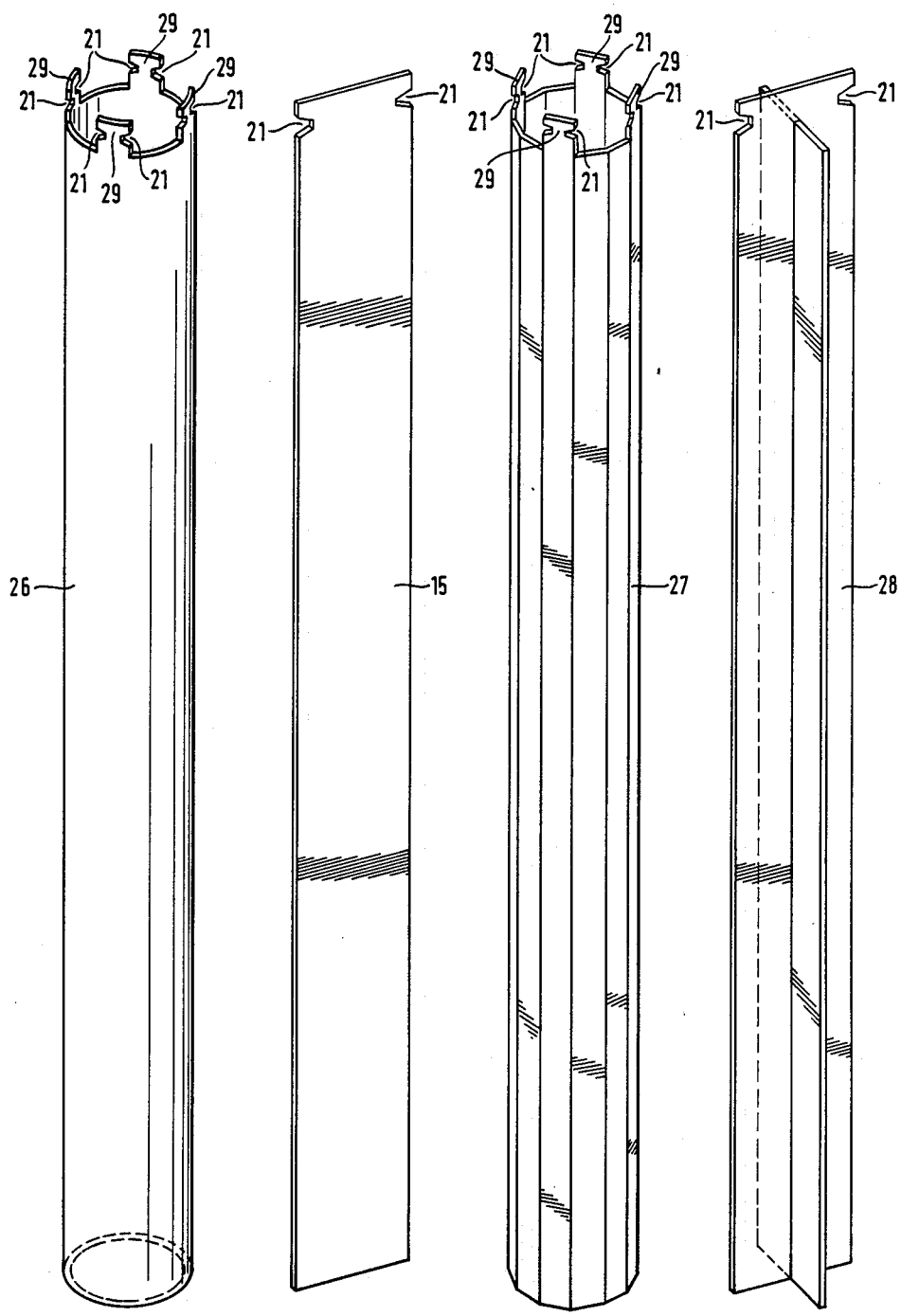

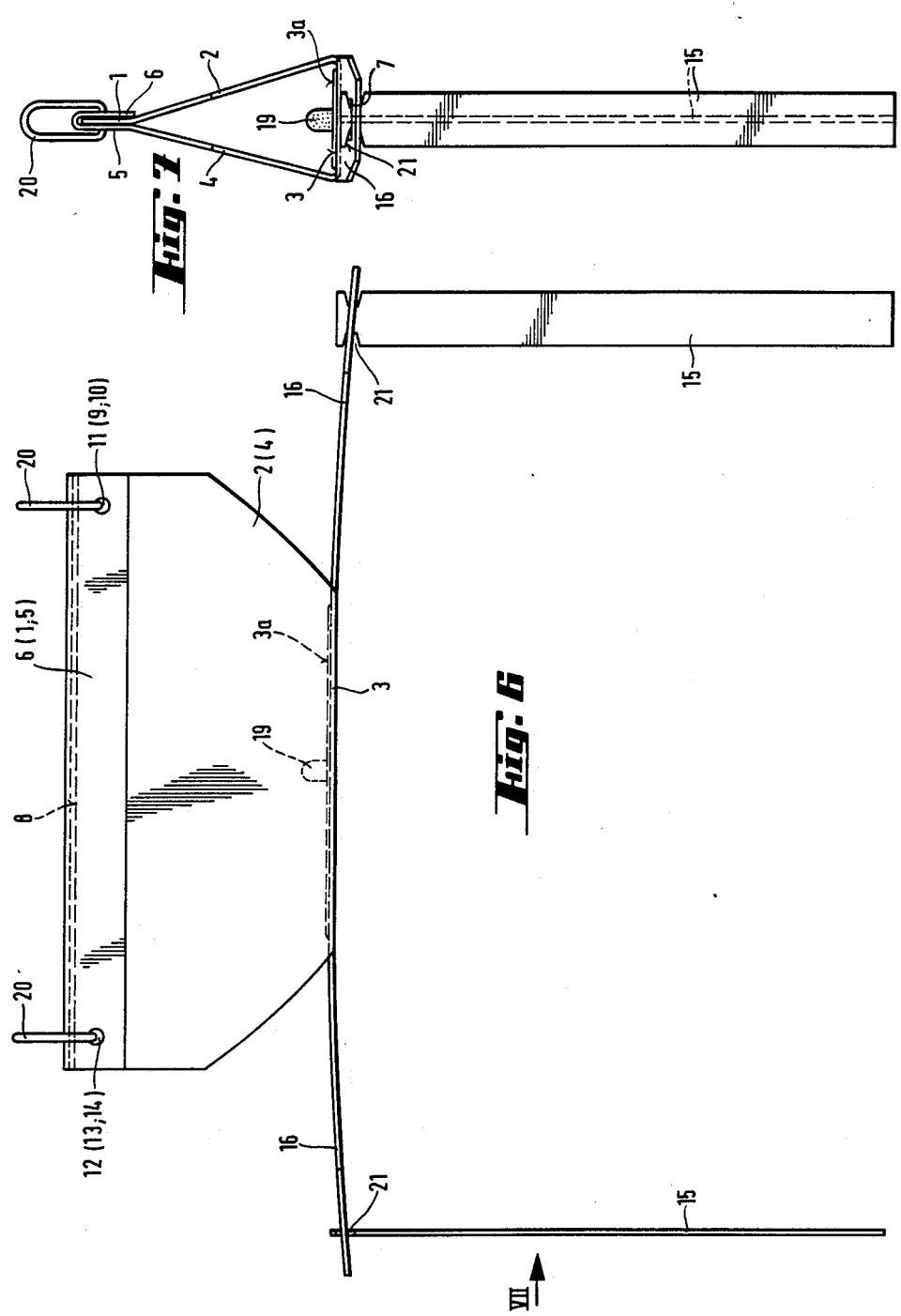

TRAP FOR FLYING INSECTS, ESPECIALLY MOTHS THAT ATTACK FOODSTUFFS

The invention relates to a trap for flying insects according to the precharacterising clause of patent claim 1.

Insects that attack stores of foodstuffs are a threat to the storage and production of foodstuffs worldwide. Among the especially hazardous insects found in storerooms are various species of moth. Prophylactic pest control is not possible in most cases since the use of pesticides and insecticides entails residues that contain harmful active ingredients and may be noxious to humans. Attempts are therefore being made to obtain reliable information on the presence and the population density of the pests first of all so that only then is specific action taken. Information on the population density of the pests is obtained from indicators in the form of traps which are distributed in a standing or suspended position. The trapped insects are counted at fixed intervals so that pest control can be carried out when the number exceeds a threshold which is known from experience.

Indicators of this type equipped with attractants are also being used increasingly for pest control. The attractants lure the pests. The attaractants used are female sex hormones, so-called pheromones. Surprisingly, the pheromones attract males and also, though to a lesser extent, females. The pheromones are usually supplied in small containers from which an amount of active ingredient that is constant with time is released by evaporation and attracts the pests. These containers are fastened to the trap.

The traps are often in the form of suspended adhesive strips of film (fly traps) or funnel traps. In the case of the funnel trap, the pest enters a space from which it cannot escape owing to the funnel-shaped entrance. Another type of trap, the so-called delta trap (Δ-trap) is described, for example, in EP-A-26 419 and in the Journal of Economic Entomology, vol. 70, No. 4, Aug. 1977, College Park, Maryla. This type of trap consists substantially of a piece of cardboard or plastics material which, when shaped approximately into a triangular form, resembles a small house. Like the fly trap, the base of the trap is coated with a non-drying adhesive or covered with an insecticide.

In the known fly traps, the pheromone, in a holder which is supplied with it, is fastened to approximately half the length of the adhesive strip. In the delta trap, it is placed in the middle of the base portion and, in the funnel trap, in the space in which the pests are trapped.

The fly trap proves very successful as a moth trap. It is simple and cheap to produce. Such a fly trap in conjunction with a pheromone is described, for example, in Swiss Patent Specification No. 614 349. Disadvantages are that the adhesive hangs in the room unprotected and it is possible that the trap may rapidly become dusty and create a dirty impression. In low rooms the adhesive may unintentionally be touched.

In contrast, the roof shape of the delta trap and also the closed funnel trap provide protection against accidental contact and the amount of dust that settles is also reduced. The use of customary commercial delta traps as bioindicators in storerooms is, however, problematical to the extent that it is not possible to see into these traps from all sides. If the traps are hung high it is necessary to climb onto a stool or up a ladder in order to observe the trap results. An advantage of the delta traps is thier construction. The approximately triangular house can be formed quickly by simply folding of a cardboard or plastics blank. In contrast, the expenditure on construction in the case of the funnel trap is relatively high. In a comparative study in a dissertation presented to the Eidgenössische Technische Hochschule, Zürich, Diss. ETH No. 6837, it was found that the delta traps and funnel traps are less successful as moth traps.

The invention solves the problem of improving such traps for pests, especially moths that attack foodstuffs, so that they can be used very successfully as bioindicators and also in pest control. This is achieved essentially by the feature introduced in the characterising part of patent claim 1. The optical attractant serves to aid the approach of the pests.

In a preferred embodiment of the invention, in a delta trap the adhesive surface at the two side openings of the trap is extended and gives the moth pests a large and easily approchable access to the trap.

In an especially preferred embodiment of the invention, a delta trap is given a transparent base thus making it possible in the case of traps that are hung up high for the trap result to be observed from below.

The invention is described below with reference to an illustrative embodiment shown in the drawings, in which:

FIG. 1 shows the blank for a delta trap,
FIG. 2 shows a cylinder as an optical attractant,
FIG. 3 shows a strip as an optical attractant,
FIG. 4 shows a prism as an optical attractant,
FIG. 5 shows two intersecting strips as an optical attractant,
FIG. 6 is a side view of the delta trap with the strips shown in FIG. 3, and
FIG. 7 is a front view of the delta trap shown in FIG. 6.

The delta trap shown in FIGS. 6 and 7 in two side views perpendicular to each other is formed from the "blank" shown in FIG. 1 and two of the strips 15 shown in FIG. 3. The fold lines which are shown as broken lines facilitate folding to give the house shape. In order to do this, two panels 2 and 4 are folded along their fold lines with a base face 3 to produce a triangular form. The panels 5 and 1 are pressed one against the other in planar relationship in the finished trap. A flap 6 is folded around the edge 8 onto the panel 1. The panels 1, 5 and 6 are fixed and held together by two clips 20. For this, the two ring-shaped clips 20 are passed through the holes 9, 10, 11 and 12, 13, 14, respectively, which have been brought into alignment with one another as a result of the folding operation.

The base face 3 is coated with a non-drying adhesive 3a in the region protected by the cover panels 2 and 4. The adhesive 3a and the base face 3 are transparent.

In the middle of the face 3 coated with the adhesive 3a there is placed a capsule 19 containing a pheromone. Two strips 15 are inserted into prepared slots 7 and thier notches 21 are used to fix them in position.

The base face 3 coated with the adhesive 3a is transparent in order to read off, i.e. count, the insects trapped in traps that are hung up high. The remainder of the trap may be coloured; the strips 15 must be clearly visible. The large entrance openings of the trap together with the approach surfaces 16 render access to the trap easier for the moths. The strips serve as an optical attractant to the moths to fly towards the trap. Use is made here of the knowledge that moth pests preferentially fly towards vertically arranged strips. These strips serve as an optical attractant to the moths, additional to the pheromone. Suitable ratios of the sides—height to width—of such a strip are values greater than 4:1. Good trap results are obtained in the range of from 7:1 to 12:1. A ratio of the sides of approximately 10:1 has proved to be the optimum.

The strips may, of course, also be coated with an adhesive, but that would give rise to the same disadvantages as in the known fly trap, that is to say the strip would easily become dusty and soiled.

In order to provide the moths with an attractant that is visiable in an optimum manner from two sides, the two strips 15 are arranged perpendicular to each other. Especially suitable from this point of view are cylinders 26 (FIG. 2) or prisms 27 (FIG. 4). Cylinders and prisms may be made from light-weight foamed material or Styropor or, in hollow form, from cardboard or plastics film. Their strip-like silhouette offers optimum optical attraction to the moth from all sides. Other very suitable forms are intersecting strips 28 (FIG. 5).

As already mentioned, slots 7 in the base of the trap may be used for fastening the strips 15. In the case of intersecting strips 28 having a cross-shaped cross-section, one strip may be made slightly longer and inserted by the lengthened portion into a prepared slot. Here too, it is possible to provide notches 21 for better fixing of the strip 28. It is, of course, also possible to have a cross-shaped slot in the trap, matching the cross-section. In the case of a cylinder 26 made from cardboard or plastics film, several tabs 29 having notches 21 which are inserted into corresponding arranged slots in the base of the trap may by used for fastening purposes. For non-hollow cylinders, punched-out circles in the base of the trap are also suitable, a circumferentially extending notching providing the necessary fixing for the cylinder. In such a solid cylinder, for example made from Styropor or foamed material, it is also possible for there to be incorporated during manufacture a short strip of cardboard which projects in the form of a tab and is used for fastening in a slot. Naturally, solid cylinders and likewise solid prisms may also simply be glued to the base of the trap.

Particularly good trap results are obtained with the trap illustrated. The transparent design of the base allows a rapid assessment of whether any pests have been trapped and, if so, how many. The luring of the pests with pheromones and the additional optical attractants not only make these traps suitable as a bioindicator but also enable pests to be controlled in a manner that is safe for food storage.

As already discussed in the case of the strips, the trap shown represents only one of the many possible embodiments. Many variations are possible. For example, the roof may be of a different construction. With an extended "roof ridge", the strips could be fastened thereon so as to hang from the extended ends. Important features of the delta trap are the large openings with the approach surfaces and the transparent base for easy observation of the trap result.

To add optical attractants to any type of trap and thus improve the trap result is the intrinsic object of the invention. Thus, also in funnel traps ro disc-shaped traps or the like, the trap results are considerably improved by fitting optical attractants—in the form of vertical strips in the case of moths that attack foodstuffs.

The vertical strips need not necessarily be constructed as separately suspended bands or elongated bodies. If the trap has a suitable surface, the strips may, for example, be glued, painted or printed thereon.

What is claimed is:

1. A trap for flying insects comprising a base with adhesive coating and a housing defining insect-entry openings and at least one opaque optical attractant suspended therefrom which is substantially vertical in the use position, has a length of at least 20 cm and a height to width ratio of greater than 4:1, and serves as an optical attractant for the insects.

2. A trap according to claim 1, wherein the height to width ratio of the said element(s) is in the range of from 7:1 to approximately 12:1.

3. A trap according to claim 1, wherein said at least one optical attractant element is a strip of thin material.

4. A trap according to claim 1, wherein said at least one optical attractant element is a cylinder or prism of ligth-weight material.

5. A trap according to claim 4, wherein said at least one optical attractant element is a hollow cylinder or a hollow prism of thin material.

6. A trap according to claim 1, wherein said at least one optical attractant element is a body of thin material which is cross-shaped in cross-section.

7. A trap according to claim 1, wherein several optical attractant elements are so arranged that the full width of an element is visible at least from two mutually perpendicular side views.

8. A trap according to claim 1, wherein n optical attractant elements are so arranged that the full width of an element is visiable form n side views, of which each successive view follows from the previous one at the same angle of 360/n.

9. A trap according to claim 1, wherein said base is approximately horizontal in the use position and is at least partially coated with an adhesive, and said at least one optical attractant element is fastened so as to hang down beneath the base.

10. A trap according to claim 9, wherein said base has at least one slot therein and said at least one optical element is fastened to said base through said slot.

11. A trap according to claim 1, wherein the base is extended on both sides of the entry openings and at least one optical attractant element is fastened so as to hang down from each of the outer ends of the base extensions.

12. A trap according to claim 1, wherein at least a portion of said base is coated with a layer of an adhesive, at least that portion of the base is transparent and the layer of adhesive is also transparent.

* * * * *